United States Patent Office 2,883,385
Patented Apr. 21, 1959

2,883,385

$\Delta^{16}$-16-CARBO-LOWER ALKOXY-3-EPIALLO-YOHIMBENES

Charles Ferdinand Huebner, Chatham, and Daniel Frederick Dickel, Berkeley Heights, N.J., assignors to Ciba Pharmaceutical Products, Inc., Summit, N.J., a corporation of New Jersey No Drawing. Application November 13, 1956
Serial No. 621,517

3 Claims. (Cl. 260—287)

This invention relates to $\Delta^{16}$-16-carbo-lower alkoxy-3-epiallo-yohimbenes, salts thereof and methods for their preparation.

The $\Delta^{16}$-16-carbo-lower alkoxy-3-epiallo yohimbenes of this invention can be represented by the formula:

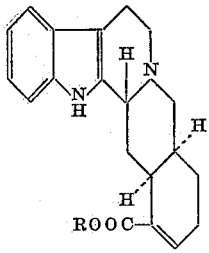

in which R represents lower alkyl, e.g. ethyl and, primarily, methyl. Salts of these compounds are, more especially, acid addition salts such as those with acids yielding therapeutically useful salts, e.g. hydrochloric, hydrobromic, hydriodic, sulfuric, phosphoric, nitric, thiocyanic, acetic, propionic, oxalic, tartaric, methane sulfonic, hydroxy-ethane sulfonic acid and the like.

The new compounds of this invention, especially the $\Delta^{16}$-16-carbomethoxy-3-epiallo-yohimbene, and their salts show adrenolytic and hypotensive properties and are useful as hypotensives.

Furthermore, they may be used as intermediates in the preparation of therapeutically useful compounds having the 3-epiallo-yohimbane structure. A specific example of a therapeutically useful compound of the 3-epiallo-yohimbane series is deserpidine, known to be a hypotensive and sedative agent, useful in various treatments of hypertensive conditions and states of anxiety.

We prepare the compounds of this invention according to different processes depending on the starting material available. Thus, the $\Delta^{16}$-16-carbo-lower alkoxy-3-epiallo-yohimbenes and their salts may be prepared by treating a $\Delta^{17}$-16$\beta$-carbo-lower alkoxy-3-epiallo-yohimbene or a salt thereof with an alkaline metal lower alkoxide under mild conditions and isolating the $\Delta^{16}$-16-carbalkoxy-3-epiallo-yohimbene or a salt thereof. A $\Delta^{17}$-16$\beta$-carbo-lower alkoxy-3-epiallo-yohimbene is more especially the corresponding 16$\beta$-carbomethoxy compound which upon treatment with an alkaline metal methoxide, e.g. sodium methoxide, in methanolic solution, is converted to $\Delta^{16}$-16-carbomethoxy-3-epiallo-yohimbene. Alkaline metal lower alkoxides are more especially sodium methoxide and ethoxide and the corresponding potassium alkoxides.

$\Delta^{17}$-16$\beta$-carbo-lower alkoxy-3-epiallo-yohimbenes, such as the $\Delta^{17}$-16$\beta$-carbomethoxy-3-epiallo-yohimbene, and their salts used as the starting materials in the above-mentioned process may be prepared according to the method given by C. F. Huebner in copending patent application Serial No. 621,518, filed on even date herewith. This is accomplished, for example, by treating the tosylate ester derived from isoraunescine [N. Hosansky and E. Smith, J. Am. Pharm. Assoc., 44, 539 (1955)] with lithium bromide and refluxing the bromo compound thus obtained with zinc in acetic acid. Salts of the starting materials used in the process are acid addition salts such as those with the acids outlined above for the end product.

The compounds of this invention may also be prepared by refluxing the tosylate obtained from a 16$\beta$-carbo-lower alkoxy-17-hydroxy-3-epiallo-yohimbane in a high-boiling organic solvent having a high dielectric constant, and isolating the $\Delta^{16}$-16-carbo-lower alkoxy-3-epiallo-yohimbene or a salt thereof. High-boiling organic solvents with a high dielectric constant are especially heterocyclic solvents containing a tertiary nitrogen, e.g. collidine, or carboxylic acid amides, e.g. formamide or dimethylformamide. The starting material for this process is known or may be prepared according to known methods. Thus, the tosylate obtained from 3-epi-$\alpha$-yohimbine is described by C. F. Huebner and D. F. Dickel, Experientia, 12, 250 (1956).

Depending on the working conditions employed the new compounds are obtained in the form of the free base or salts thereof. The salts can be converted into the free base in the conventional manner, e.g. treatment with an alkali hydroxide such as sodium hydroxide. The free base may be converted into acid addition salts, for example, by treatment with acids such as those exemplified above.

The following examples will serve to illustrate the invention. They are not to be construed as being limitations thereon. Temperatures are given in degrees centigrade.

*Example 1*

0.5 g. of the $\Delta^{17}$,16$\beta$-carbomethoxy-3-epiallo-yohimbene are refluxed for 30 minutes in 20 ml. of methanol containing 0.05 g. of dissolved sodium. Most of the methanol is distilled under reduced pressure and the residue diluted with water and extracted with 50 ml. of chloroform. The chloroform is washed with water, dried over sodium sulfate and distilled off under reduced pressure. The residue is dissolved in 20 ml. of ethanol and acidified with 6 N ethanolic hydrogen chloride. A prompt precipitate of the crystalline $\Delta^{16}$-16-carbomethoxy-3-epiallo-yohimbene hydrochloride appears which is recrystallized from methanol, M.P. 270–275° C.

The starting material used in the above process may be prepared as follows:

To 1 g. of isoraunescine dissolved in 10 ml. of pyridine is added 1 g. of p-toluene-sulfonyl chloride with cooling to keep the temperature at 10° C. After standing overnight at this temperature, the reaction mixture is diluted with 20 g. of ice water and treated with 3 ml. of concentrated aqueous ammonia. The mixture is then extracted with 50 ml. of chloroform, the chloroform washed with water, dried over sodium sulfate and concentrated to dryness under reduced pressure. Isoraunescine tosylate crystallizes as the solvent is removed. It is collected with methanol in which it is very insoluble and recrystallized from a large volume of methanol. It melts at 227–230° C.

0.5 g. of isoraunescine tosylate dissolved in 10 ml. of pyridine is heated on the steam bath with 1 g. of lithium bromide for six hours. The reaction mixture is then diluted with 200 g. of ice water and the crystalline bromo compound which separates is collected by filtration. It is recrystallized from a large volume of methanol and melts at 207° C.

0.25 g. of the above bromo compound dissolved in 10 ml. of glacial acetic acid is stirred and refluxed with 1 g. of zinc dust for 15 minutes. The zinc residue is filtered off and most of the acetic acid distilled off under reduced pressure. The residue is diluted with water, made basic with ammonia and extracted with 50 ml. of chloroform. The chloroform is washed with water, dried over sodium sulfate and distilled to dryness under reduced pressure. The crystalline β,γ-unsaturated ester of the formula:

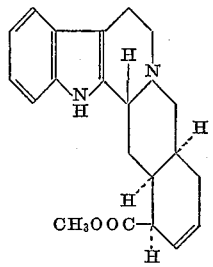

is recrystallized from a large volume of methanol, M.P. 223–225° C.

*Example 2*

10 g. of the tosylate from 3 epi-α-yohimbine [F. E. Bader et al., J. Am. Chem. Soc., 77, 3547 (1955)] is refluxed in 100 ml. of collidine for 2 hours. Most of the collidine is removed under reduced pressure, the residue mixed with 100 ml. of water, basified with aqueous ammonia and extracted with 100 ml. of chloroform. The chloroform is washed with water, dried over sodium sulfate and the solvents removed under reduced pressure. The residue is dissolved in ethanol, acidified with ethanolic hydrogen chloride and the crystalline $\Delta^{16}$-16-carbomethoxy-3-epiallo-yohimbene hydrochloride is collected, showing no melting point depression with the product obtained according to the method given in Example 1.

What is claimed is:

1. Process according to claim 3, wherein collidine is used as the tertiary organic base.

2. Process for the preparation of $\Delta^{16}$-16-carbomethoxy-3-epiallo-yohimbene of the formula:

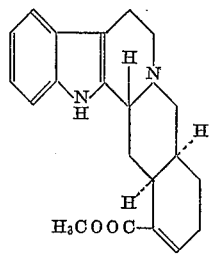

which comprises refluxing $\Delta^{17}$-16-carbomethoxy-3-epiallo-yohimbene of the formula:

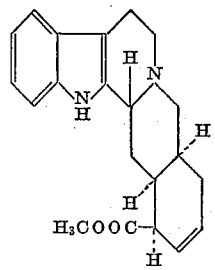

with a solution of sodium methoxide in methanol.

3. Process for the preparation of $\Delta^{16}$-16-carbomethoxy-3-epiallo-yohimbene of the formula:

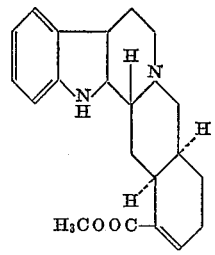

which comprises refluxing the tosylate obtained from 16β-carbomethoxy-3-epiallo-yohimbene of the formula:

in a tertiary organic base.

References Cited in the file of this patent

Janot et al.: Bull. Soc. Chim. Mem. [5], vol. 16, May–June 1949.